United States Patent
Williams

(10) Patent No.: US 9,643,203 B2
(45) Date of Patent: May 9, 2017

(54) SPRAY BOOTHS

(75) Inventor: Michael Williams, Sudbury (GB)

(73) Assignee: SPRAY-BOOTH TECHNOLOGY LIMITED, Sudbury (GB)

( * ) Notice: Subject to any disclaimer, the term of this patent is extended or adjusted under 35 U.S.C. 154(b) by 664 days.

(21) Appl. No.: 13/995,756

(22) PCT Filed: Dec. 9, 2011

(86) PCT No.: PCT/GB2011/052445
§ 371 (c)(1),
(2), (4) Date: Sep. 2, 2013

(87) PCT Pub. No.: WO2012/085535
PCT Pub. Date: Jun. 28, 2012

(65) Prior Publication Data
US 2013/0337733 A1    Dec. 19, 2013

(30) Foreign Application Priority Data

Dec. 23, 2010  (GB) .................................. 1021825.3

(51) Int. Cl.
*B05B 15/12* (2006.01)
*B05C 15/00* (2006.01)

(52) U.S. Cl.
CPC ...... *B05B 15/1222* (2013.01); *B05B 15/1248* (2013.01); *B05B 15/1296* (2013.01); *Y02B 10/30* (2013.01); *Y02P 70/36* (2015.11)

(58) Field of Classification Search
CPC ....................... B05B 15/1222; B05B 15/1296
USPC ..................................... 454/50, 52
See application file for complete search history.

(56) References Cited

U.S. PATENT DOCUMENTS

| | | | | |
|---|---|---|---|---|
| 1,980,224 A | * | 11/1934 | Paasche | B05B 15/1222 118/64 |
| 2,137,862 A | * | 11/1938 | Steins | B05B 15/1222 118/64 |
| 2,761,373 A | * | 9/1956 | Owen | B05B 15/1222 118/326 |
| 2,829,582 A | * | 4/1958 | Abbott | B05B 15/1222 182/14 |
| 4,231,289 A | * | 11/1980 | Domicent | B05B 15/1214 118/326 |
| 4,237,780 A | * | 12/1980 | Truhan | B01D 46/12 110/102 |
| 4,590,847 A | * | 5/1986 | Hull | B05B 15/1222 239/455 |
| 4,714,010 A | * | 12/1987 | Smart | B08B 15/02 118/425 |
| 5,042,420 A | * | 8/1991 | Gerdes | B05B 15/1214 118/326 |
| 5,063,835 A | * | 11/1991 | Rockx | B05B 15/1222 118/326 |

(Continued)

FOREIGN PATENT DOCUMENTS

| | | |
|---|---|---|
| EP | 1120168 A1 | 8/2001 |
| GB | 706600 A | 3/1954 |

*Primary Examiner* — Steven B McAllister
*Assistant Examiner* — Jonathan Cotov
(74) *Attorney, Agent, or Firm* — Mossman Kumar & Tyler PC

(57) ABSTRACT

A spray booth (100) for providing a controlled environment for spraying of particulate material is disclosed. The spray booth (100) is mounted on a support rail, and is movable along the support rail.

11 Claims, 12 Drawing Sheets

(56) References Cited

U.S. PATENT DOCUMENTS

| | | | | |
|---|---|---|---|---|
| 5,228,621 A * | 7/1993 | Wilson | ............... | A01M 7/0064 239/172 |
| 5,277,652 A * | 1/1994 | Minor | ............... | B05B 15/1222 454/52 |
| 5,749,779 A * | 5/1998 | Wilburn | ............... | F24F 3/1607 454/65 |
| 6,334,578 B1 * | 1/2002 | House | ............... | A01M 7/0014 239/159 |
| 6,361,427 B1 * | 3/2002 | Sjoberg | ............... | B08B 15/005 454/64 |
| 2003/0192472 A1 * | 10/2003 | Hihn | ............... | B05B 15/1222 118/326 |
| 2007/0056510 A1 * | 3/2007 | Antaya | ............... | B05B 15/1296 118/326 |
| 2007/0160768 A1 * | 7/2007 | Ohnstad | ............... | B05B 13/0207 427/421.1 |

\* cited by examiner

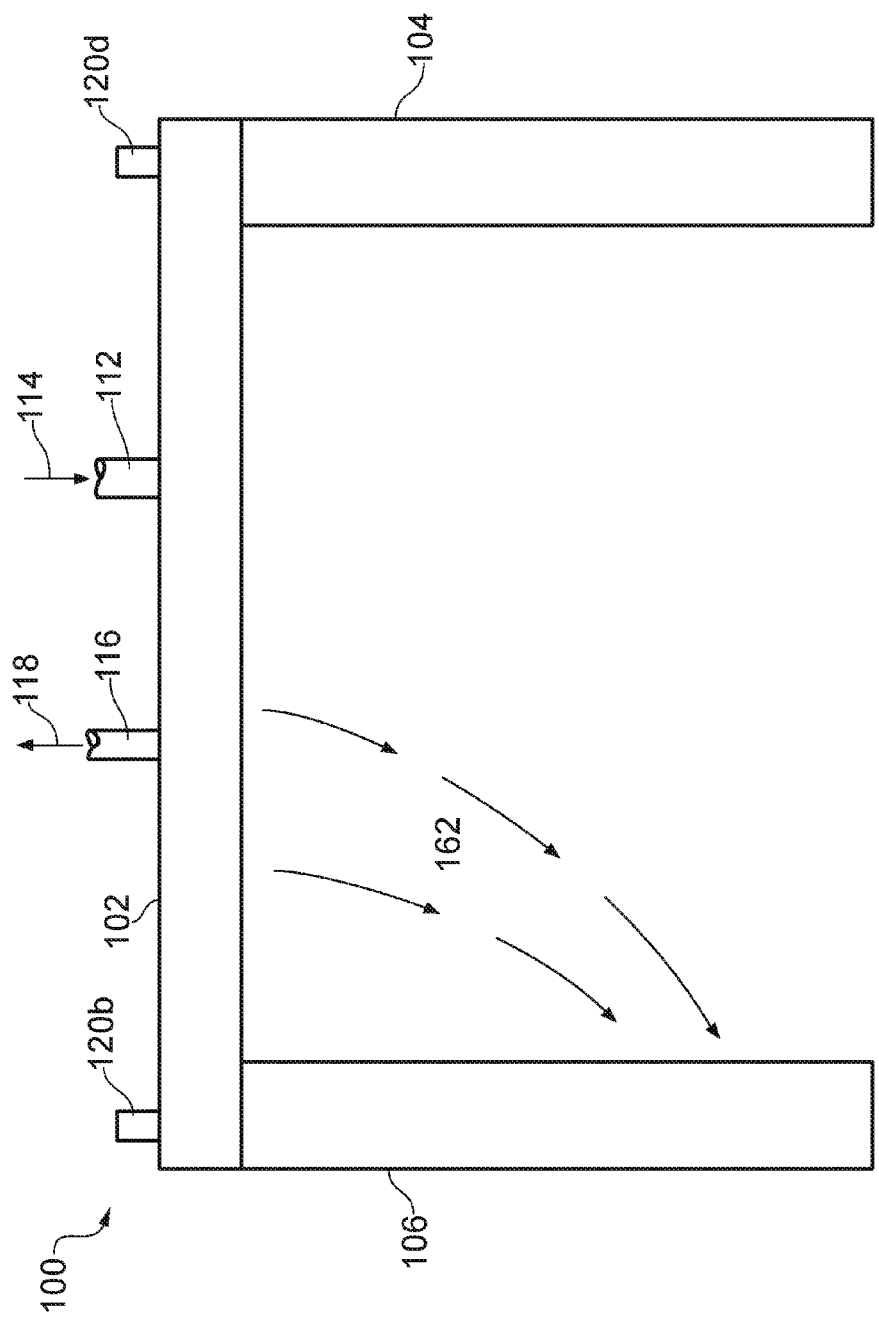

SPRAY BOOTHS

BACKGROUND OF THE INVENTION

A spray booth is a structure that provides a ventilated, air filtered and temperature controlled environment in which spraying activities such as painting and powder coating can take place. A spray booth is necessary for the safe execution of such activities, since the sprayed materials include solvents and particulate material that must not enter the atmosphere in large quantities. The particulate material that does not stick to the article being sprayed must be removed from the spraying area to ensure safe working conditions, and to manage environmental impact.

A spray booth also provides a controlled supply of filtered air that aids the spraying process and leads to higher quality finishes. In addition, it is necessary to heat sprayed materials in order to dry them (in a process known as baking), and the spray booth provides a controlled temperature environment in which such baking can be undertaken.

By way of example and explanation, one typical automotive spray booth is illustrated in FIGS. 1 and 2 of the accompanying drawings. The spray booth 1 comprises a roof portion 10 from which two pairs 12, 14 and 13, 15 of side portions extend to the ground, thereby forming a closed chamber in which spraying can be carried out. One or more of the side portions is movable to allow an object, in this case a car 3, to be located in the chamber for spraying.

A plenum 16 is formed adjacent the roof 10 by the provision of a filter element 18 substantially parallel to, and spaced from the inner surface of the roof portion. The filter element 18 may extend across the whole of the roof portion 10, as illustrated, or may be provided across only a limited area. As will be described in more detail below, an input air flow 20 is supplied into the plenum 16, after which it passes through the filter 18 and forms an incoming air flow 22. Ideally the air flow 22 is uniform across the width of the booth.

The airflow 22 passes around the object 3, and forms an outgoing air flow 24. This outgoing airflow 24 passes through an outgoing filter 26, into an extraction area 28, and into an extraction duct 30 which provides an extracted airflow 32. The extraction area 28 is provided below the object 3 being sprayed, and typically extends below the ground surface of the location of the spray booth 1.

The input airflow is provided by air handling equipment, such as that shown for illustrative purposes in FIG. 3 of the accompanying drawings. The air handling equipment 40 of FIG. 3 comprises input ducting 44 which guides air 42 into the equipment from the atmosphere. A fan unit 46 is provided for drawing in the air 42, and for moving the air via ducting 47 to a heater 48 which operates to heat the air to a desired temperature. The temperature controlled air 20 is then provided to the spray booth via ducting 49.

Air extraction from the booth 1 is provided by air extraction equipment, such as that shown for illustrative purposes in FIG. 4 of the accompanying drawings. The extracted airflow 32 is drawn through ducting 50 by an extraction fan unit 52. The airflow passes through a further filtration unit 54 before exiting to atmosphere 58 via further ducting 56.

The spray booth 1 of FIGS. 1 and 2 and the air handling equipment of FIGS. 3 and 4 has been described by way of example and illustration only, and it will be readily appreciated that the design and construction of a spray booth can vary. For example, the input and output air handling equipment can be combined to reduce the number of fan units and reduce the heating requirements by using recirculation of air.

It will also be appreciated that the principles of the spray booth described above can be applied to a booth of any scale for enabling spraying of objects of any size. For example, one spray booth could be provided for the spraying of small components, whilst another could be provided for the spraying of aircraft, or wind turbine towers. Naturally, the specific design requirements of each application will determine the size and specification of the spray booth and the equipment, but the principles remain the same as for the automotive booth described above.

In the automotive sector, a body shop which repairs and repaints cars and other vehicles, may have the need for several spray booths to enable multiple jobs to be carried out at any one time. However, it has been recognised that the movement of vehicles in such a body shop can lead to increased work times, and so body shops are starting to use workshop bays for multiple tasks, only one of which is repainting. For example, a damaged vehicle may be driven into the workshop and positioned in a repair bay in which a range of actions will be carried out on the vehicle. Damaged mechanical parts may be replaced, and damaged bodywork repaired or replaced. Once this repair work has been carried out, the vehicle must then be transferred to the spray booth for finishing. In order to reduce the number of vehicle movement in the workshop, each work area can be equipped as a spray booth, so that, in effect, all repair work is carried out in the controlled environment provided by the booth. However, such a solution is expensive, both in terms of capital cost, and in terms of running costs. Since not all actions require the provision of a controlled environment, such costs are unnecessary.

Accordingly, it is desirable to provide a solution that reduces the number of vehicle movements in the workshop, whilst providing the required controlled environments for spraying and finishing at a reasonable cost.

SUMMARY OF THE INVENTION

According to a first aspect of the present invention, there is provided a spray booth for providing a controlled environment for spraying of material, the spray booth comprising a roof portion provided with at least one mounting bracket for attachment to a support rail, such that the booth is movable along such a support rail when in use, first and second end portions which extend from respective opposing ends of the roof portion, first and second side portions which extend from respective opposing sides of the roof portion, thereby defining a work space between the roof portion, the end portions and the side portions, the first and second side portions each defining an opening therethrough, and each including a movable member having a first position in which the opening is closed, and a second position in which the opening is substantially open, and an air extraction unit which extends from the roof portion into the work space, and operable to extract air from the work space.

Each such movable member may extend, in the first position, beyond a lowermost part of at least one of the first and second end portions.

One example of such a spray booth further comprises a plenum defined in the roof portion, and a filter element, wherein the air extraction unit is operable to extract air from the work space, and to supply such extracted air to the plenum, the plenum and filter element being arranged so as to enable filtered air to be returned into the work space during operation of the air extraction unit.

Such an air expellation unit may be operable to expel from the booth a predetermined proportion of air from the plenum, and may comprise a fan unit mounted on the roof portion, and an expellation filter. Such a booth may further comprise an air outlet connected with the fan unit, and arranged for connection to an air outlet chimney.

An example spray booth may comprise a plurality of such air extraction units, each such unit being operable to extract air from the work space.

Such air extraction units may be located in respective corners of the booth, and may be operable independently of one another.

An example spray booth may further comprise at least one ground engaging element which extends from one of the end portions or one of the side portions. Another example spray booth may further comprise a plurality of such ground engaging elements.

According to a second aspect of the present invention, there is provided a spray booth installation comprising a support rail, and a spray booth in accordance with the first aspect of the present invention, wherein the spray booth is suspended from the support rail so as to be movable along the support rail.

According to a third aspect of the present invention, there is provided a kit of parts for a spray booth in accordance with the first aspect of the present invention.

According to a fourth aspect of the present invention, there is provided a kit of parts for a spray booth installation in accordance with the second aspect of the present invention.

According to another aspect of the present invention, there is provided a method of operating such a spray booth, in which material spraying equipment is enabled only when the or each air extraction unit is operating.

In such a method, an auxiliary electrical supply to the work space may be enabled only when the or each air extraction unit is not operating.

BRIEF DESCRIPTION OF THE DRAWINGS

FIGS. 12 and 13 illustrate respective airflows.

DETAILED DESCRIPTION OF THE PREFERRED EMBODIMENTS

Figure 1:
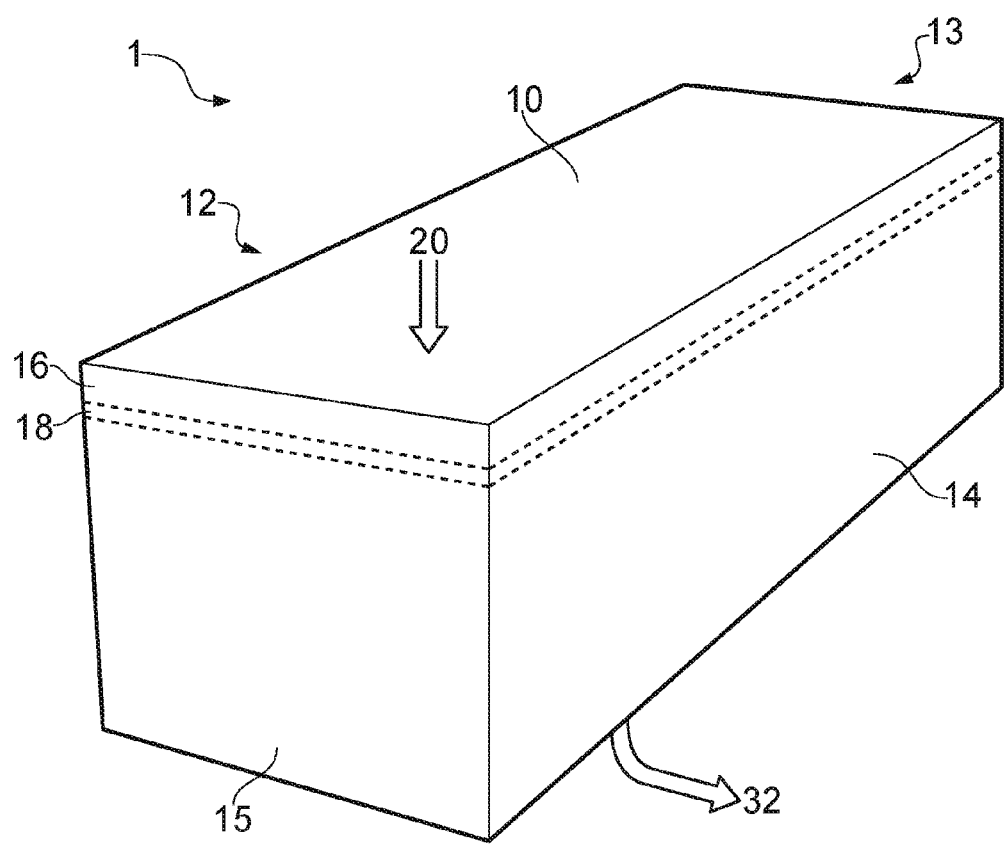
FIGS. 1 and 2 illustrate a known spray booth.
Figure 2:
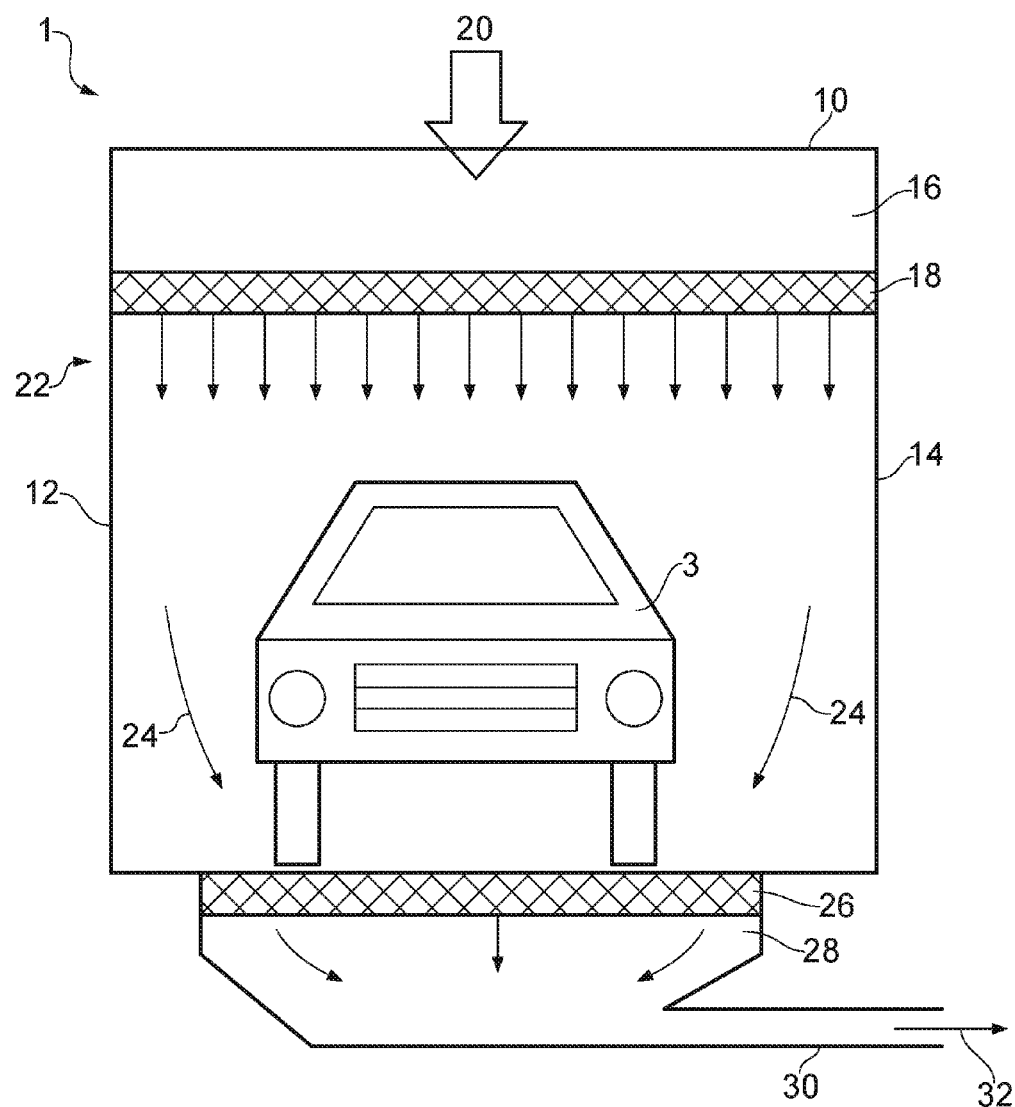
Figure 3:
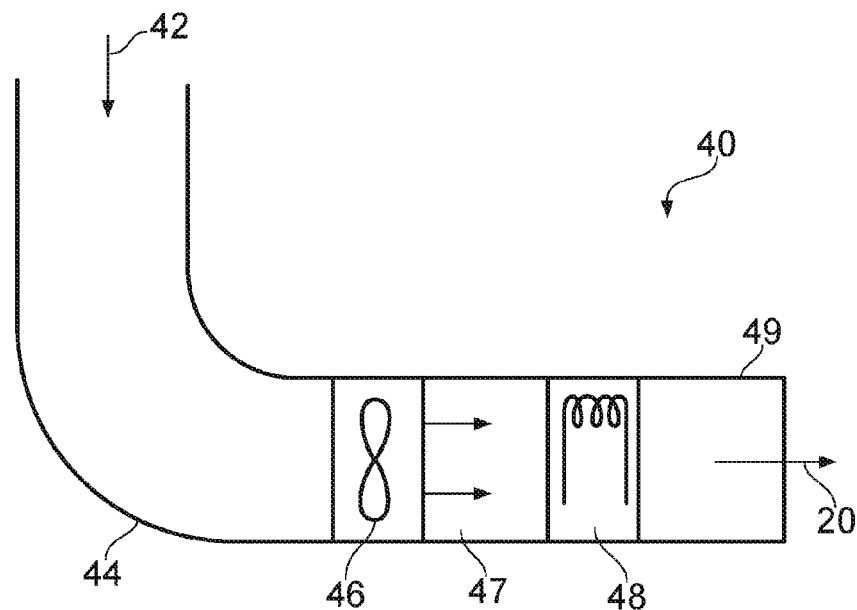
FIGS. 3 and 4 illustrate known air handling equipment for the spray booth of FIGS. 1 and 2.
Figure 4:
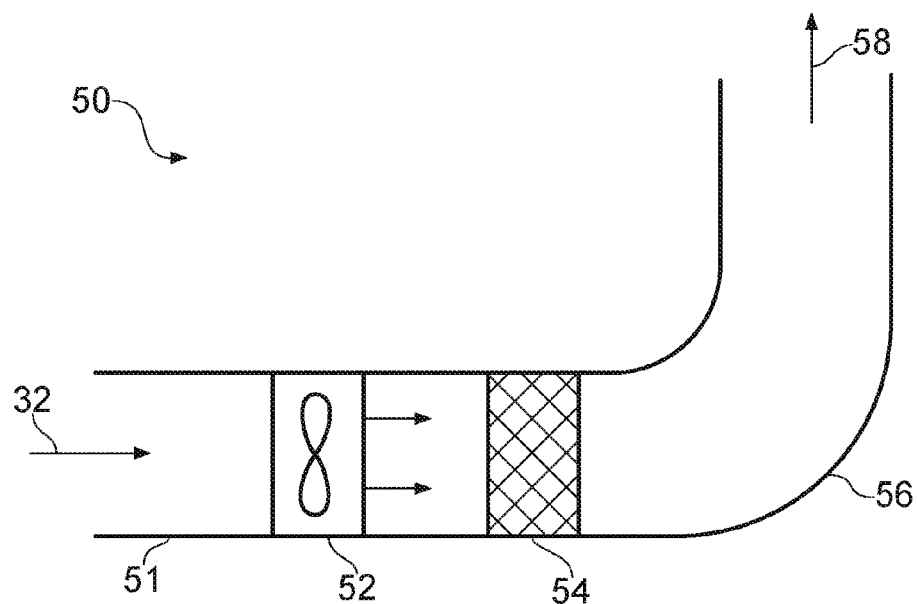
Figure 5:
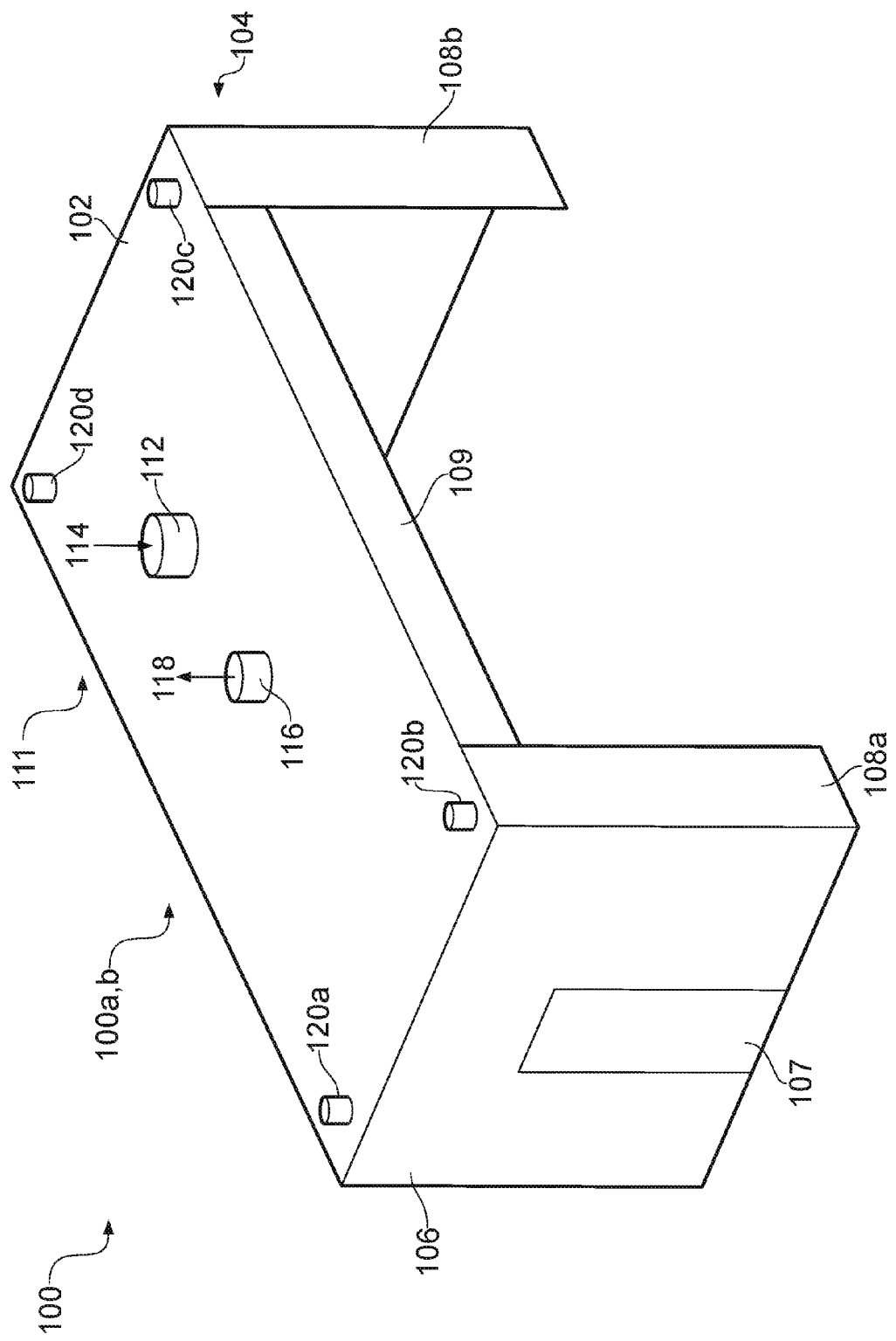
FIGS. 5 and 6 illustrate a spray booth embodying one aspect of the present invention.

FIG. 5 illustrates a spray booth 100 which embodies one aspect of the present invention. The spray booth, 100, comprises a roof portion 102, from which extends first and second end portions 104 and 106 and first and second side portions, 108 and 110, so as to define an enclosed work space. The end portions 104 and 106 are at opposite ends of the spray booth 100, and the side portions 108 and 110 are at opposite sides of the booth 100. The roof portion 102, the end portions 104 and 106, and the side portions 109 and 110 define a work space therebetween.

Figure 6:
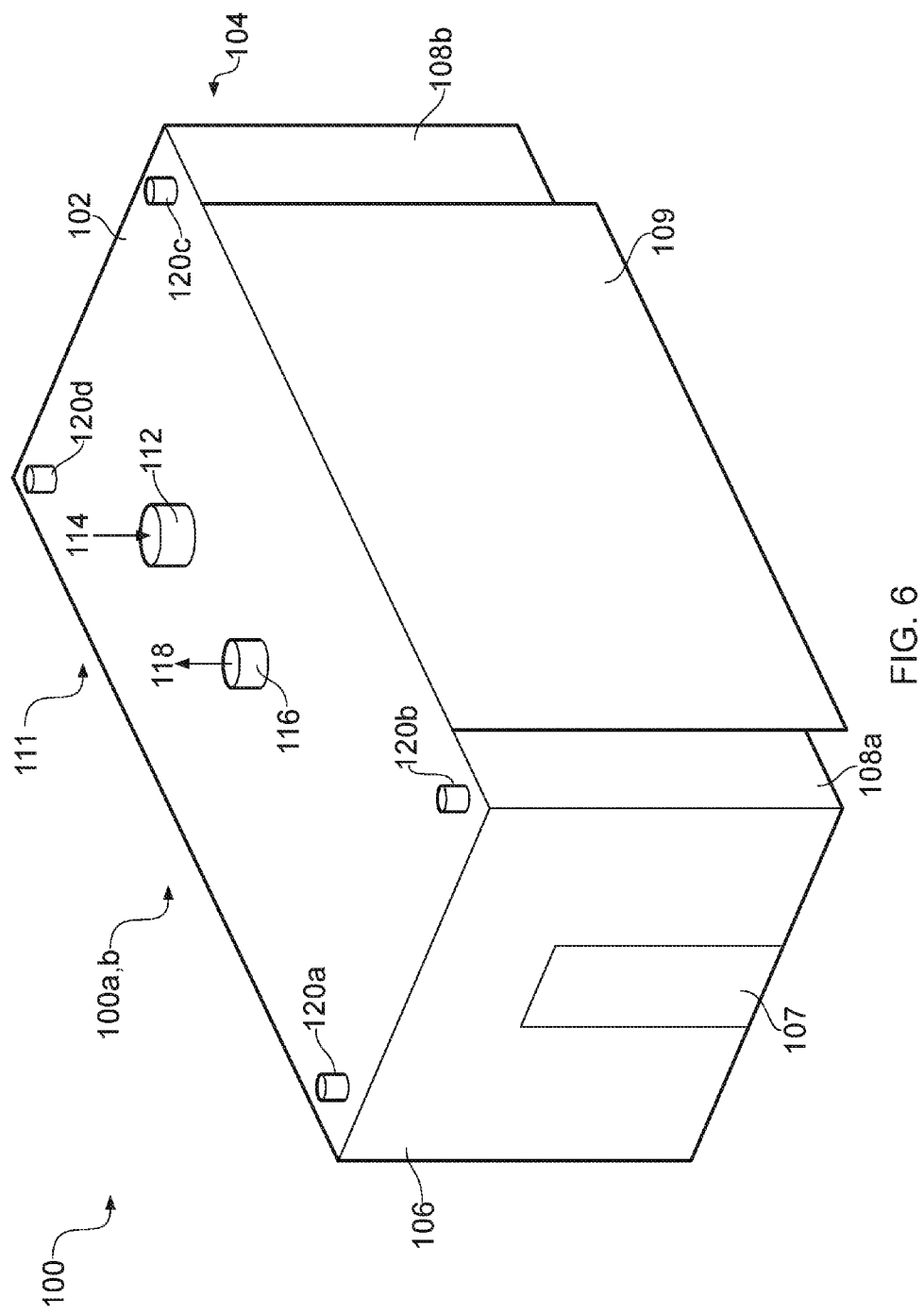

The first side portion 108 is made up of two partial side portions 108a and 108b, such that the side portion of the spray booth 100 defines an opening. A movable side curtain 109 is provided for closing the opening of the side of the booth, as shown in FIG. 6. Similarly, the second side portion 110 is made up of a pair of partial side portions 110a and 110b, and a movable side curtain 111 is provided for closing the opening in the second side. The second end portion 106 is provided with an access door 107.

The roof portion 102 of the booth 100 defines a plenum as with the booth described above. Air extracted from the workspace is introduced into the plenum, and returned to the workspace through a filter (not shown for clarity) located in the roof portion 102. Air extractors 120 are provided to draw air from the workspace into the roof portion 102. In the example shown in FIG. 5, four such extractors are provided, but any suitable number may be used.

An air outlet 116 is provided on the roof portion 102 for expelling a predetermined proportion of the air from the workspace to atmosphere. Expelling a proportion of the workspace air reduces the concentration of solvent in the workspace air. The filtration provided serves to remove particulate material from the air in the workspace. The proportion of air expelled to atmosphere is determined by statutory limits on the concentration and amount of solvent that can be expelled from the booth, and on limits on solvent concentration within the booth.

In order to replace the expelled air, it is necessary to provide a source of "fresh" air into the booth. In one example, such as that shown in FIG. 5, an air inlet 112 is defined in the roof portion 102. The air inlet allows an incoming air flow 114 to enter the plenum, and hence the booth 100. In another example, fresh air is allowed to enter the booth through ventilation gap between the end portions and the floor. Replacement air may be provided using either or both of these techniques. It will be appreciated that the accompanying Figures illustrate the roof mounted inlet, but that this need not be present in a booth embodying the principles of the present invention.

Figure 8:
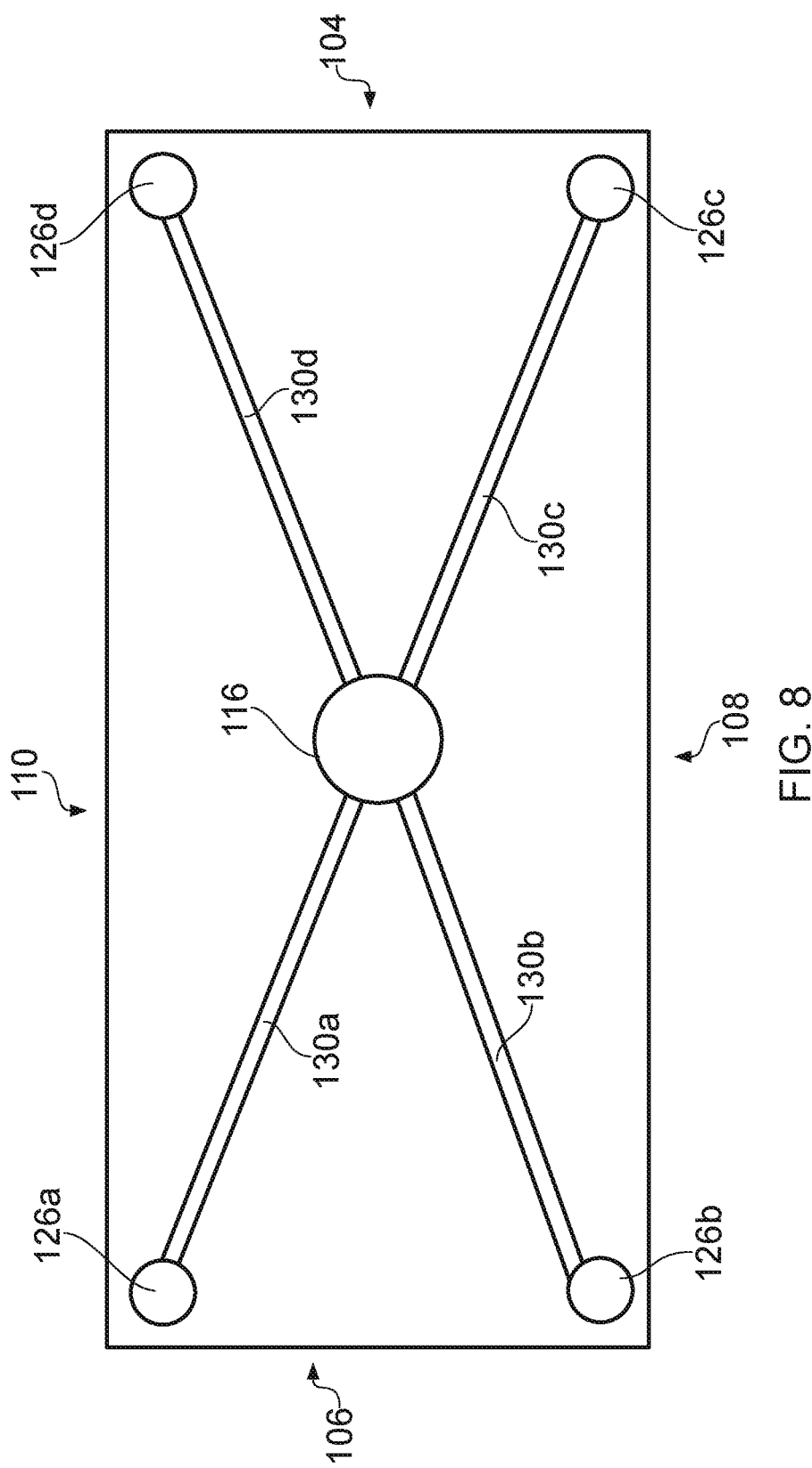
FIG. 8 illustrates air extraction equipment for the booth of FIGS. 5 and 6.

FIG. 8 illustrates one possible example of ducting to provide workspace air into the plenum region. It will be appreciated that ducting is not required to enable air extracted from the workspace to be introduced into the plenum, and that if ducting is chosen, that any appropriate design may be used.

Figure 7:
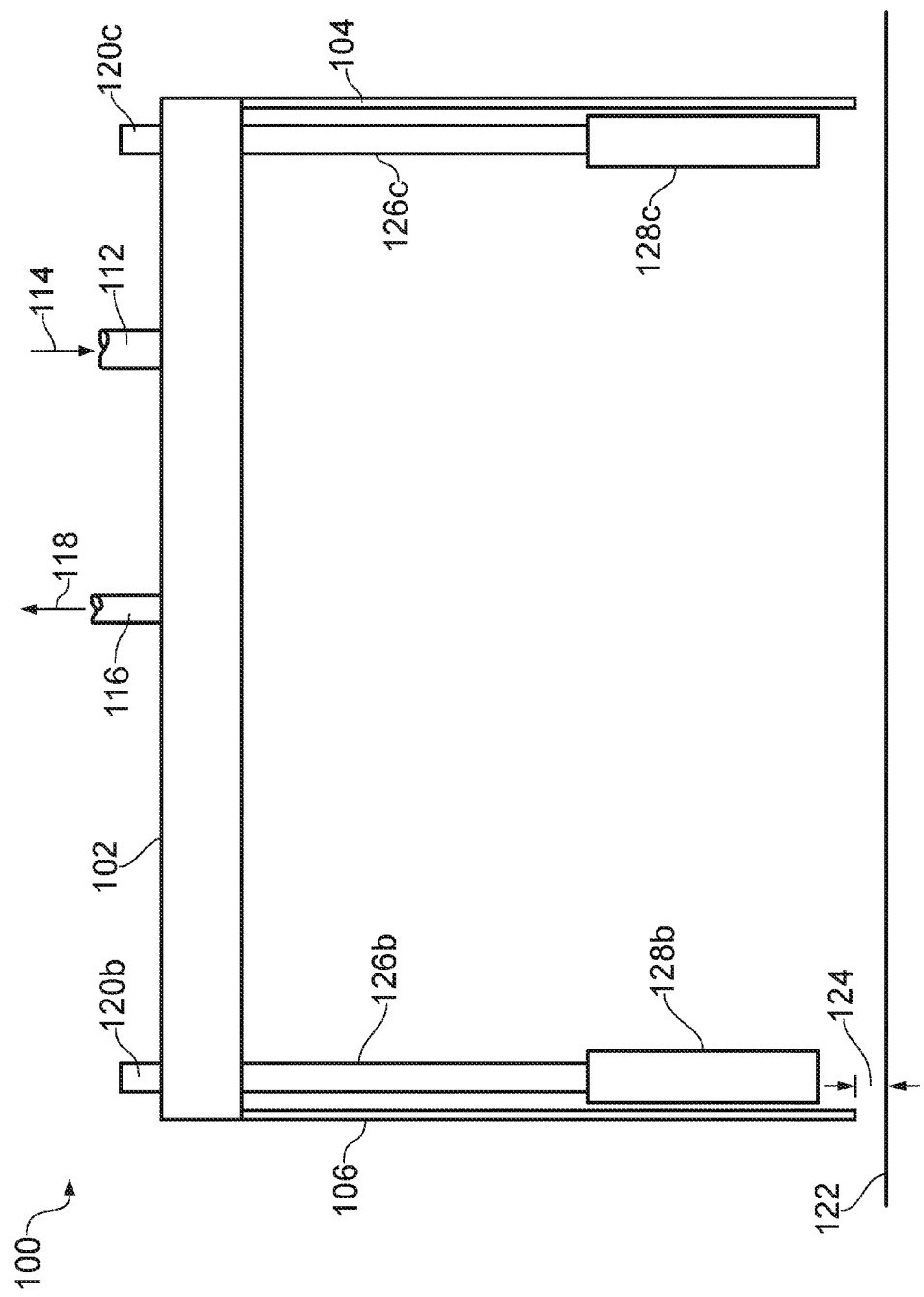
FIG. 7 is a side view of the booth of FIGS. 5 and 6.

FIG. 7 illustrates a side view of the booth of FIGS. 5 and 6, with the side portions and movable curtains removed for the sake of clarity. The roof portion 102 defines the plenum therein, and the first and second end portions 104 and 106 extend downwardly from the roof portion 102. Associated with each air extractor 120 are an extraction duct 126 and an extraction filter 128, which extend down from the roof portion 102 towards the floor 122. The air extractor units operate to draw in air from the booth, through the extraction filter 128 and extraction duct 126. The extracted air is then pumped to the air outlet 116, via outlet ducting 130, as illustrated in FIG. 8.

It is to be noticed in FIG. 7 that the first and second end portions 104 and 106 of the booth 100 do not reach the ground level 122 when the booth is installed, and a ventilation gap 124 is therefore provided. This ventilation gap 124 is provided in order to allow air to be drawn into the booth 100, which is kept at a slightly negative pressure with respect to the air pressure outside the booth 100. The movable curtains 109 and 111 for the first and second side portions 108 and 110 can be extended to the ground level (see FIG. 6), to provide an effective seal, thereby preventing leakage of spray material and air from the sides of the booth.

Figure 9:
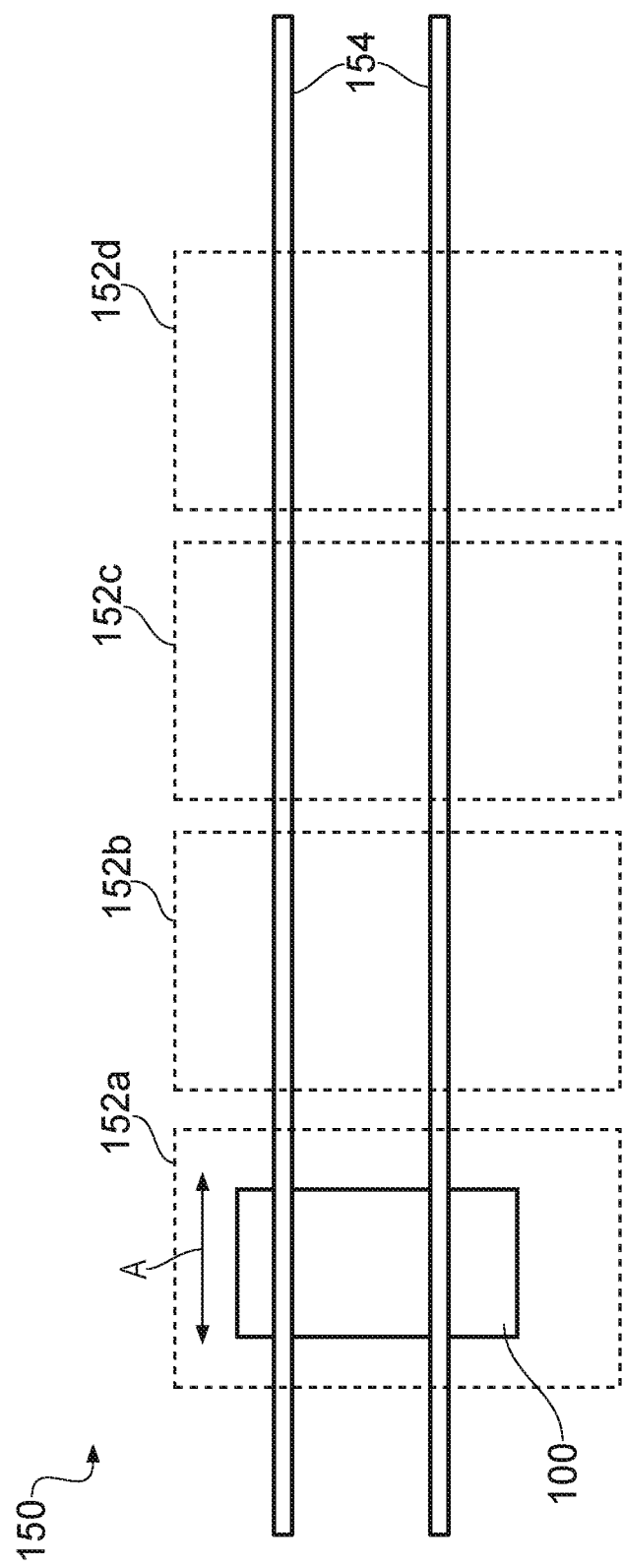
FIG. 9 is a schematic view of a spray booth of FIGS. 5 and 6 in use.
Figure 10:
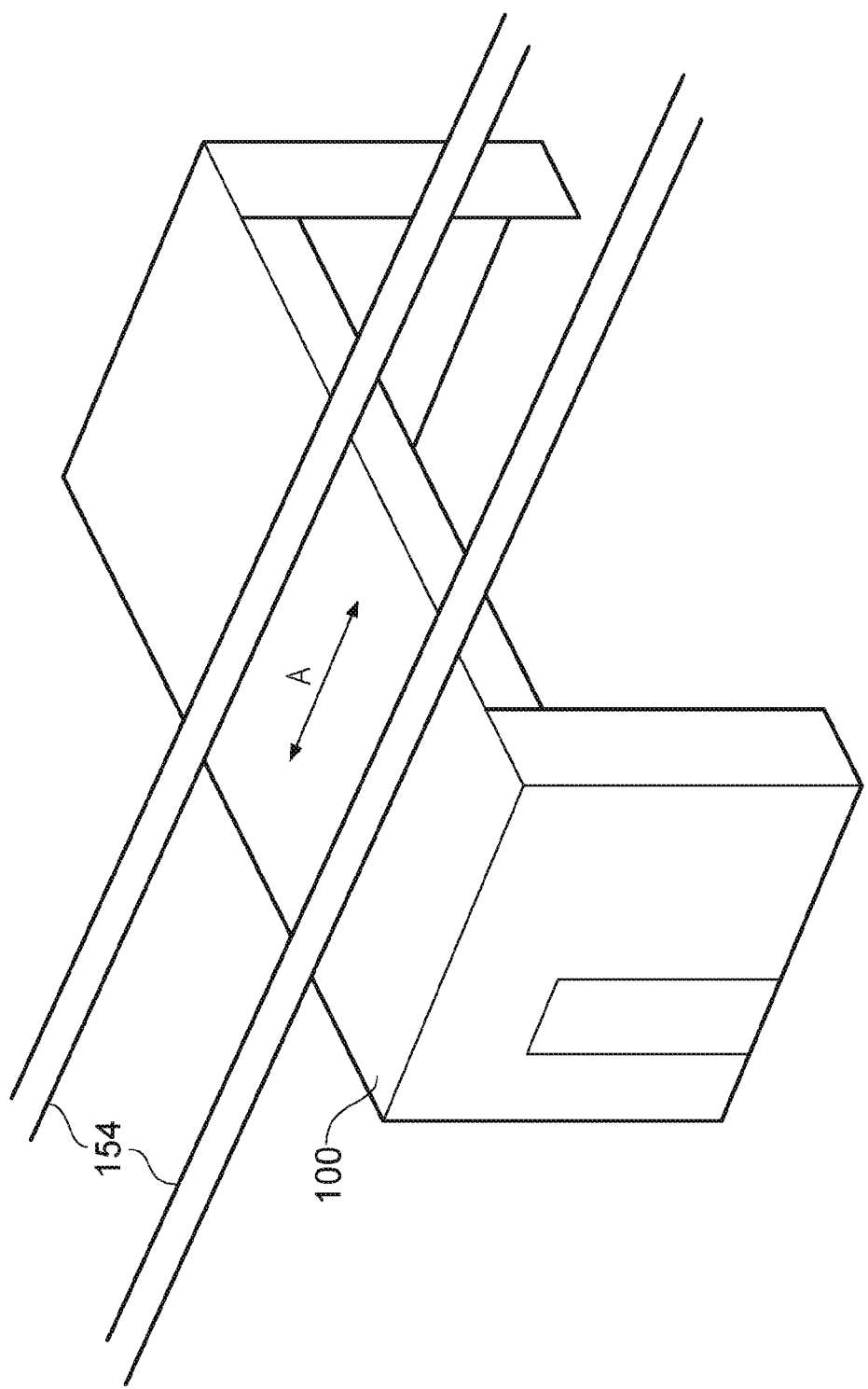
FIGS. 10 and 11 illustrate the booth of FIGS. 5 and 6 in use.

FIG. 9 illustrates mounting of the booth 100 in a workshop environment 150. The booth 100 is suspended from a pair of rails 154 which extend across the workshop 150. The rails would typically be attached to the walls of the workshop, or suspended themselves from the roof of the workshop. FIG. 10 illustrates schematically the relative positions of the booth 100 and rails 154.

Reverting to FIG. 9, the workshop 150 defines a series of working areas 152 (in this example four such areas are illustrated, but any number could be provided). The support rails 154 extend across the working areas 152, and enable the booth 100 to be moved from one working area to another, in the direction shown by arrow A. In order for the booth 100 to be moved from one area to another, the movable side curtains 109 and 111 are raised, so as to provide the side openings. These openings allow the booth to move over the vehicles in the working areas, and so to be moved along the rails to the next working area requiring the spray booth. This may be the area next to the existing area, or may be any one of the other areas 152 in the workshop 150. When the booth 100 is to be used, the curtain side are closed, and the booth operated.

Figure 11:
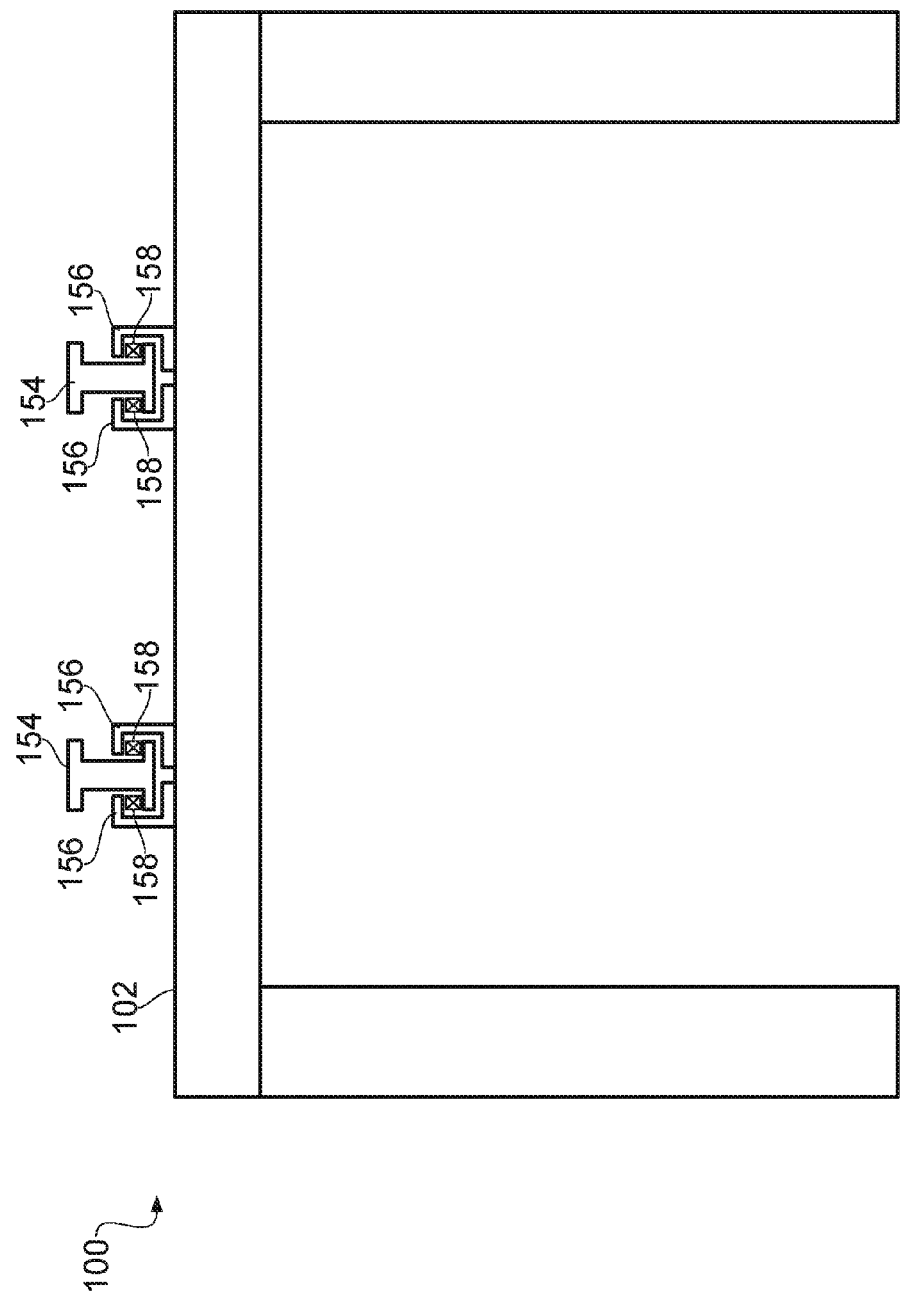

FIG. 11 illustrates one example of how the booth 100 can be supported on the rails 154. The rails 154 in FIG. 11 are provided by steel I-beams, as these are a common building component, and are capable of supporting the weight of the spray booth. The booth 100 is provided with a series of support brackets 156 which are attached to the roof portion 102 of the booth 100, and which extend around and over lower sections of the I-beam rails. The brackets 156 are supported on the rails by bearings 158. In the example shown, the booth is provided with four brackets 156 and associated bearings 158. However, it will be readily appreciated that any appropriate number of support brackets and bearings may be provided.

In order to enable the booth to be moved and operational quickly, the air outlet 116 may be connect with an exhaust chimney using flexible ducting or a suitable moving-seal arrangement. The air inlet 112 may also be provided with such a movable coupling.

The spray booth embodying the present invention is preferably delivered to the installation site in the form of a kit of parts, which are then assembled. The kit of parts would include a roof frame, panels for the roof portion 102, end portions 104 and 106 and side portions 108. The movable curtains 109 and 111, the air input and extraction equipment and other sundry equipment is delivered to site for installation on/in the booth.

Figure 12:
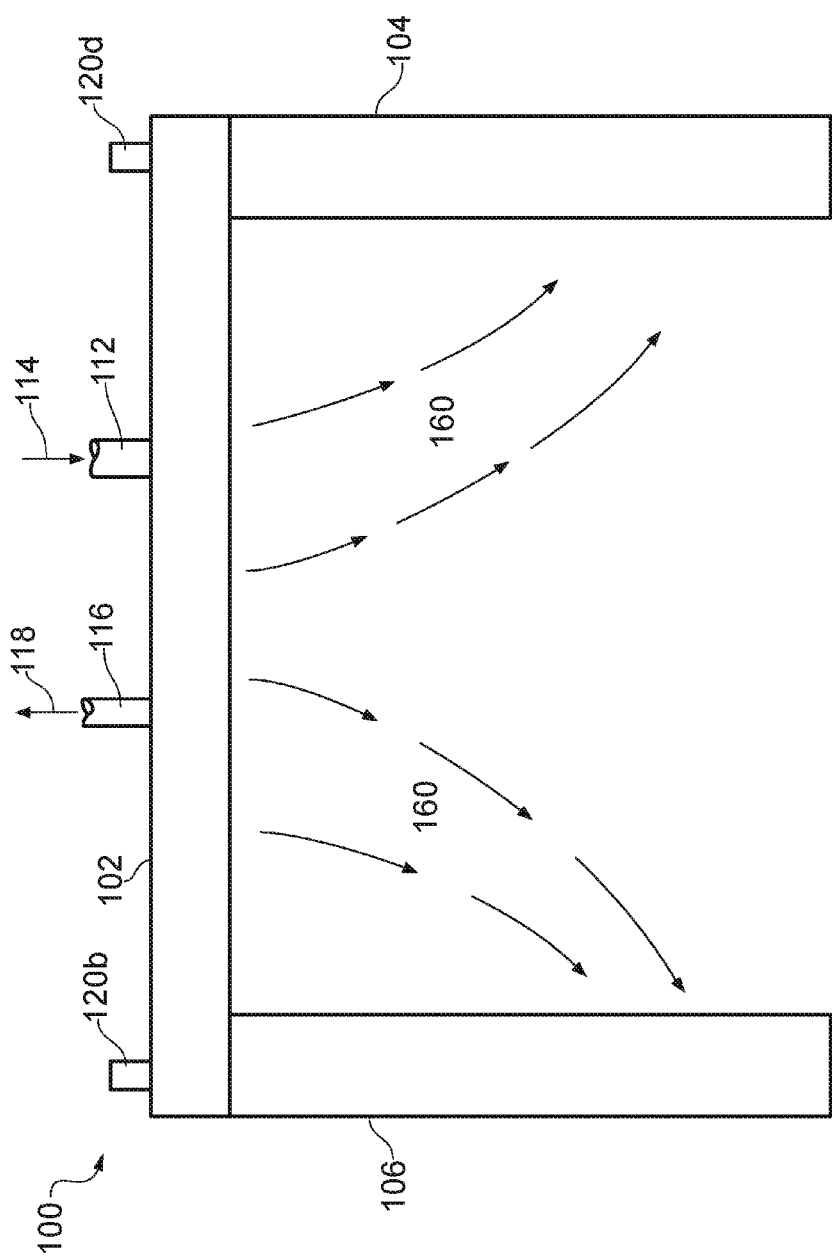

The plenum of the booth 100 embodying the present invention can be divided into a number of sub-plenum areas, so that airflow in the booth can be controlled. The air extraction units can be independently controlled in order to enhance this airflow control. FIG. 12 illustrates a situation in which all of the air extraction unit 120 are operational and all areas of the plenum are operational. Such a situation results in a full airflow 160 across the whole of the work space of the booth 100. FIG. 13 illustrates a situation in which the air extraction units 120a and 120b and one end of the booth 100 are operational, together with the appropriate part of the plenum, such that an airflow 162 is provided only in a desired part of the work space. It will be readily appreciated that this independent control of air extraction units, and plenum areas, enables the operator of the booth to run only the air handling equipment required by each job. For example, a repair to only a small portion of a vehicle may not require full spray booth operation.

An example control scheme for such a spray booth will now be discussed. Such a method has two basic modes of operation. In a first mode, known as "standby" mode, only air extraction through the outlet 116 is operational, such that air is drawn from the workspace into the roof space and then expelled to atmosphere through the outlet 116. The air extractors 120 are not operational in this standby mode In this standby mode, the level of solvents in the workspace is controlled, and so is used to clear the booth following spraying, for example for a paint drying phase or an inspection phase. The paint drying phase may make use of agitated air, heated air, or infra-red or ultra violet light sources. During the standby mode, electrical power sources for the drying and inspection equipment are enabled. Also during the standby mode, air supplies to spraying equipment within the booth are disabled, in order to prevent spraying without the correct extraction operating.

During a second mode of operation, the so-called "spray mode", the extraction fans 120 are used to draw air (and air borne overspray and solvents) out of the workspace. As described above, this extraction serves to draw air from the workspace into the roof portion, for return via a roof filter. This returned airflow provides the required flow around the object being sprayed, so as to remove overspray. During the spray mode, a predetermined proportion of air is expelled to atmosphere through the outlet 116.

In both the standby and spray modes, the expellation of air through the outlet 116 creates a negative pressure, with respect to atmospheric pressure, within the booth 100. Such a negative pressure region ensures that solvents and particulate material is retained within the booth as a whole, for filtering or controlled outlet as appropriate.

Another example spray booth incorporates wheels or other ground engaging elements on the lower part of the end and/or side portions, in order that some of the mass of the booth can be carried directly by the floor. For example, if it is not possible to install the required steel work to support the entire mass of the booth, then wheels or other suitable supports can be provided. In another example, the entire mass of the booth can be supported by wheels or other suitable supports. If wheels or other supports are provided, then these may run freely on the floor, or may be guided by channel, rails or other appropriate guides.

Although aspects of the invention have been described with reference to the embodiment shown in the accompanying drawings, it is to be understood that the invention is not limited to the precise embodiment shown and that various changes and modifications may be effected without further inventive skill and effort.

The invention claimed is:

1. A spray booth for providing a controlled environment for spraying of material onto a vehicle, the spray booth comprising:

a roof portion provided with at least one mounting bracket for attachment to a support rail located above the roof portion, such that the booth is supported by, and is movable along, the support rail when in use;

first and second end portions which extend from respective opposing ends of the roof portion, the first and second end portions having respective lower edge regions which extend adjacent a floor surface when the booth is in use, and at least one of the first and second end portions being spaced apart from that floor surface when the spray booth is in use;

first and second side portions which extend from respective opposing sides of the roof portion, thereby defining a work space between the roof portion, the end portions and the side portions, the first and second side portions each defining an opening therethrough, and each including a movable member having a first position in which the opening is closed, and a second position in which the opening is substantially open;
a plenum defined in the roof portion, the plenum having an internal volume, an air inlet for reception of air into the internal volume, and an air outlet for the supply of air from the internal volume to the work space, the air outlet having a filter element located therein for the filtering of air passing therethrough, such that filtered air is passed from the internal volume into the work space; and
a plurality of air extraction units which extend from the roof portion into respective corner regions of the work space, each corner region being adjacent an end portion and a side portion of the booth, each air extraction unit including an inlet spaced apart from the roof portion and an outlet connected for the supply of air to the air inlet of the plenum, each air extraction unit being operable to extract air from the work space and to supply air extracted from the work space to the internal volume of the plenum.

2. The spray booth as claimed in claim 1, wherein each such movable member extends, in the first position, beyond a lowermost part of at least one of the first and second end portions.

3. The spray booth as claimed in claim 1, wherein the air extraction units are operable independently of one another.

4. The spray booth as claimed in claim 1, further comprising at least one ground engaging element which extends from one of the end portions or one of the side portions.

5. The spray booth as claimed in claim 1, further comprising a plurality of ground engaging elements each of which extends from at least one of: one of the end portions, and one of the side portions.

6. The spray booth as claimed in claim 1, further comprising a support rail, wherein the spray booth is suspended from the support rail so as to be movable along the support rail.

7. A spray booth as claimed in claim 1, wherein the inlets of the air extraction units are adjacent the floor surface when the spray booth is in use.

8. A spray booth as claimed in claim 1, wherein the inlets of the air extraction units are located closer to the floor than to the roof portion when the spray booth is in use.

9. A spray booth as claimed in claim 1, wherein the plenum provides air into the work space at a first rate, and the air extraction units extract air from the work space at a second rate, the first rate being lower than the second rate.

10. A spray booth installation comprising a support rail, a floor surface below the support rail and a spray booth for providing a controlled environment for spraying of material supported by the support rail above the floor surface, wherein the spray booth comprises:
a roof portion provided with at least one mounting bracket slidably attached to the support rail, such that the booth is supported by, and is movable along, the support rail;
first and second end portions which extend from respective opposing ends of the roof portion, at least one of the first and second end portions being spaced apart from the floor surface;
first and second side portions which extend from respective opposing sides of the roof portion, thereby defining a work space between the roof portion, the end portions and the side portions, the first and second side portions each defining an opening therethrough, and each including a movable member having a first position in which the opening is closed, and a second position in which the opening is substantially open, wherein each such movable member extends, in the first position, beyond a lowermost part of at least one of the first and second end portions;
a plenum defined in the roof portion, the plenum having an internal volume, an air inlet for reception of air into the internal volume, and an air outlet for the supply of air from the internal volume to the work space, the air outlet having a filter element located therein for the filtering of air passing therethrough, such that filtered air is passed from the internal volume into the work space; and
a plurality of air extraction units which extend from the roof portion into respective corner regions of the work space, each corner region being adjacent an end portion and a side portion of the booth, each air extraction unit including an inlet spaced apart from the roof portion and an outlet connected for the supply of air to the air inlet of the plenum, each air extraction unit being operable to extract air from the work space and to supply air extracted from the work space to the internal volume of the plenum.

11. A method of using a spray booth which provides a controlled environment for spraying of material onto a vehicle and which is located on and above a floor surface, the spray booth comprising a roof portion attached to a support rail located above the roof portion by at least one mounting bracket, such that the booth is supported by, and is movable along, the support rail, first and second end portions which extend from respective opposing ends of the roof portion, the first and second end portions having respective lower edge regions which extend adjacent the floor surface, at least one of the first and second end portions being spaced apart from the floor surface, first and second side portions which extend from respective opposing sides of the roof portion, thereby defining a work space between the roof portion, the end portions and the side portions, the first and second side portions each defining an opening therethrough, and each including a movable member having a first position in which the opening is closed, and a second position in which the opening is substantially open, a plenum defined in the roof portion, the plenum having an internal volume, an air inlet for reception of air into the internal volume, and an air outlet for the supply of air from the internal volume to the work space, the air outlet having a filter element located therein for the filtering of air passing therethrough, such that filtered air is passed from the internal volume into the work space, and a plurality of air extraction units which extend from the roof portion into respective corner regions of the work space, each corner region being adjacent an end portion and a side portion of the booth, each air extraction unit including an inlet spaced apart from the roof portion and an outlet connected for the supply of air to the air inlet of the plenum, each air extraction unit being operable to extract air from the work space and to supply air extracted from the work space to the internal volume of the plenum, the method comprising:
moving a vehicle into a working position on the floor, such that the support rail extends above the vehicle, in a lateral direction with respect to the vehicle;
moving the movable member of the first side portion to the second position;
moving the spray booth along the support rail in a direction lateral to the vehicle so as to enclose the vehicle in the work space of the spray booth;

moving the first movable member of the first side portion to the first position;
operating air input equipment and the air extraction units so as to provide a controlled environment within the work space of the spray booth;
performing a predetermined task on the vehicle;
at the completion of the predetermined task, moving one of the movable members of the side portions to the second position;
moving the spray booth along the support rail in a direction away from the side having the movable member in the second position, so that the work space is moved away to the vehicle; and
removing the vehicle from the working position on the floor.

* * * * *